(No Model.)

M. W. DEWEY.
ELECTRICALLY PROPELLED VEHICLE.

No. 464,246. Patented Dec. 1, 1891.

WITNESSES:
J. J. Laass
A. F. Walz

INVENTOR:
Mark W. Dewey,
By Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRICALLY-PROPELLED VEHICLE.

SPECIFICATION forming part of Letters Patent No. 464,246, dated December 1, 1891.

Application filed March 2, 1891. Serial No. 383,471. (No model.)

*To all whom it may concern:*

Be it known that I, MARK W. DEWEY, residing at Syracuse, in the county of Onondaga and State of New York, have invented new and useful Improvements in Electrically-Propelled Vehicles, (Case No. 86,) of which the following, taken in connection with the accompanying drawings, is a full, clear, and exact description.

My invention relates to certain improvements in electrically-propelled vehicles.

The object of my invention is to electrically guide or steer a self-propelled wheeled vehicle easily, accurately, and while being propelled at a high speed, and this without great exertion or rapid and long movements.

The object of my invention, also, is to provide more efficient steering apparatus for my fire-engine patented February 17, 1891, No. 446,703.

Another object of my invention is to obtain the power necessary for guiding the carriage from the propelling electric motor or from a motor in continuous operation without reversing its movement or changing its speed.

To this end my invention consists in the combination, with a wheeled vehicle having two axles and one of said axles adapted to turn on a vertical axis to steer or guide the vehicle, of a circular rack connected to the axle, an electric motor mounted upon the vehicle, two loose pinions on a shaft geared to said rack and driven in opposite directions by the motor, a clutch between the pinions to clutch either pinion and to turn the shaft, and means to operate the clutch.

My invention consists, also, in the combination, with the steering axle or wheels of a vehicle, of an electric motor, a suitable clutch to connect the motor with the axle, electromagnets in a circuit to operate the clutch, and a switch to control the current in the circuit.

My invention consists, further, in the combination, with the steering axle or wheels of an electrically-propelled vehicle, of an electric motor connected to the said axle or wheels, and controlling mechanism for said axle or wheels having movable parts, one of said parts adapted to be moved by hand and the other part arranged to be moved by the motor or steering-axle.

My invention consists, still further, in certain other combinations of parts hereinafter described, and specifically set forth in the claims.

Figure 1:
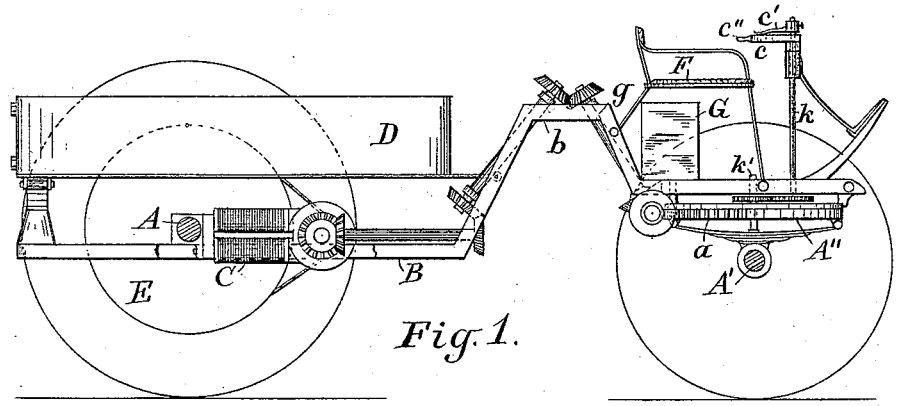
Figure 2:
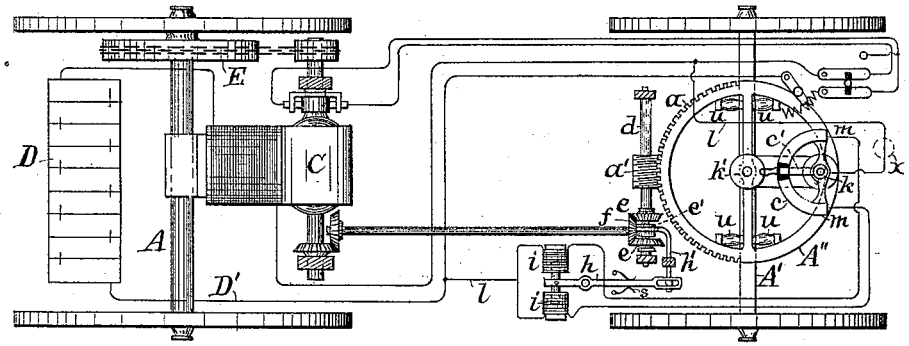
Figure 3:
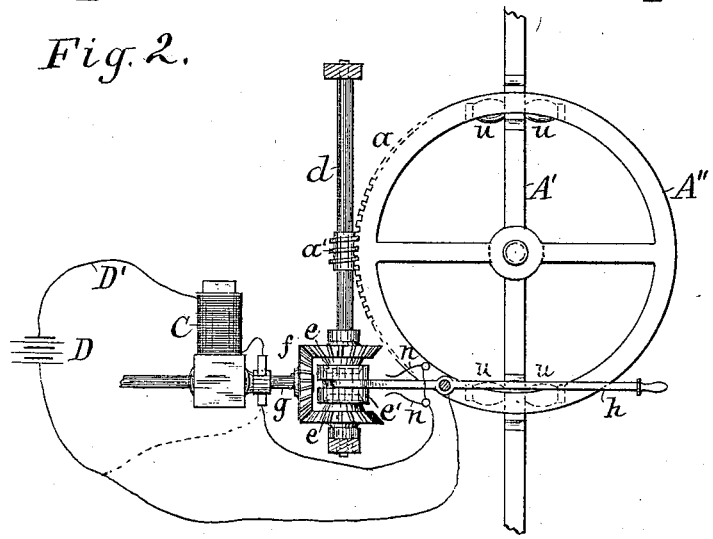

Referring briefly to the drawings, Figure 1 is a side elevation of an electrically-propelled vehicle equipped with my invention. Fig. 2 is a plan view of the same somewhat differently arranged to show the invention more clearly and completely, and Fig. 3 is an enlarged modified form of my steering apparatus.

In the drawings, A is the rear or driving axle, A' is the front or steering axle, and B is a frame extending between and supported by said axles.

C is the electric motor for propelling and steering the vehicle supported in front of the rear axle by the same and the frame.

D is a receptacle on the vehicle, containing a storage or secondary battery for supplying the said motor with current, and D' is the circuit containing the battery and motor.

The motor C is shown connected to the rear wheels through a suitable compensating gear E to allow the relative movement of the wheels when turning a corner. The frame B has a raised portion at *b* and is so shaped to allow the wheels on the steering-axle A' to be cramped under said frame to permit the vehicle to make short turns while being propelled. Above the steering-axle A' and fixed thereto is a fifth-wheel or circle A'', having a rack *a* for a screw or worm to work in on about half of its periphery.

*a'* is the screw or worm on a shaft *d*, extending crosswise of the vehicle and to be suspended from the frame thereof. At one end of said shaft is a clutch mechanism, (shown more clearly in Fig. 3,) consisting of two mitered gear-wheels *e*, mounted loosely upon the shaft and with cones on the sides facing each other, and a sleeve *e'* on the shaft between the said gear-wheels, with ends shaped to receive the cones thereon. The said sleeve is capable of movement between the gear-wheels lengthwise of the shaft and is connected to the shaft by a spline and groove, so that the shaft will be turned therewith. When the sleeve is moved lengthwise on the shaft in either direction, a cone on one of the gear-wheels is pressed against the end of the sleeve, and the said gear-wheel is forced against a collar fixed to the shaft on the opposite side of the gear-wheel. The gear-wheels on the shaft $d$ are continuously revolved in opposite directions by means of a third mitered gear-wheel $f$ in mesh with them and turned by a shaft $g$ at right angles to the shaft $d$.

Motion is transmitted from the motor-shaft to the gear-wheel $f$ by an irregular line of shafting $g$ and mitered gear-wheels.

I do not limit myself to the specific connection shown between the motor and the steering-axle, as any other suitable mechanical connection may be employed to transmit power from the motor to said axle. The said mechanical connection is journaled or supported by the frame B and has a raised portion at $b$, corresponding to the raised portion of the frame, to permit the front wheels of the vehicle to pass under.

I do not limit myself to operating the steering mechanism by the propelling-motor, as a separate motor may be provided for steering, and this motor may be mounted upon the front part of the frame beneath the steersman's seat F. In this case the gear-wheel $f$ may be mounted upon an extension of the motor-shaft, as shown in Fig. 3 of the drawings. The sleeve $e'$ may be moved on the shaft to clutch the gear-wheels on either side by means of a hand-lever $h$ alone, as shown in Fig. 3; but it is greatly preferred to operate the lever electrically or by electro-magnets or solenoids $i$, as shown in Fig. 2. In practice, however, the lever connected with the sleeve is directly operated by the magnets and extends upward from the sleeve $e'$ beneath the seat F, and both lever and magnets are inclosed by a box G, as shown in Fig. 1; but for the sake of showing the electrical connections with the magnets clearly the lever $h$ is shown connected to the sleeve $f$ by a sliding bar $h'$. The lever may be maintained in a central position by springs $s$, bearing against both sides thereof.

The magnets $i$ are placed on each side of the lever $h$, with their poles facing the same, and are connected in branches or parallel in a circuit $l$ around the motor C. The magnets may be of high resistance, or another resistance may be placed in their circuit, if required, as indicated at $x$.

In front of the seat F is a switch having two parts—one part $c$ capable of being moved by hand, and the other part $c'$ arranged to be moved by the motor or the steering-axle of the vehicle. The latter part is connected directly with or geared to the steering-axle or its operating mechanism, as shown, so that it will rotate with said axle in either direction and stop in any position when the movement of the axle stops. This part is shown in the drawings as a switch-arm fixed to a vertical shaft $k$, geared to a short vertical shaft $k'$, fixed to the steering-axle and above the center thereof. The part $c$ to be operated or rotated by hand is a semicircular rim of non-conducting material mounted to turn upon the shaft $k$ below the arm $c'$. Upon the upper face of the rim and in the path of travel of the end of the arm are two metal plates $m$, one on each side, with a space between, so that when the arm $c'$ is in its central position or extending lengthwise of the vehicle its free end will rest upon the insulating material of the rim between the said plates. Each plate is connected to a branch of the circuit $l$, containing one of the magnets $i$, and the arm $c'$ is connected to the other terminal of the circuit.

When it is desired to cramp the axle in either direction while the motor is in operation, it is only necessary to revolve the part $c$ on the shaft $k$ by means of the handle $c''$ in the direction and to the distance desired to move the axle and then stop. The steering-axle will closely follow the movement of the part $c$ and stop at the point where the part $c$ stopped, as the switch-arm $c'$ will move with the axle, and when it reaches the insulation between the plates $m$ on the rim the circuit will be broken and the lever $h$ will return to its central position between the gear-wheels $e$ $e$, to remain until the part $c$ is again moved in either direction, when the axle $A'$ will be moved likewise also.

The fifth-wheel $A''$ is shown cushioned in the drawings by cushions $u$ to relieve the gearing from sudden strains.

If the motor C is employed only for steering and it is desired to break the circuit $D'$ when the lever $h$ is in its central position, it may be done, as shown in Fig. 3, by connecting one terminal of the circuit with the fulcrum of the lever and the other terminal with stationary contact-springs $n$, with which the lever is brought in contact when moved to either side from its central position.

The details of construction may be modified without departing from the spirit of my invention.

Having now described my invention, what I claim as new, and desire to secure by Letters Patent, is—

1. The combination, with a wheeled vehicle having two axles and one of said axles adapted to turn on a vertical axis to steer or guide the vehicle, of a circular rack connected to the axle, an electric motor mounted upon the vehicle, two loose pinions on a shaft geared to said rack and driven in opposite directions by the motor, a clutch between the pinions to clutch either pinion and to turn the shaft, and means to operate the clutch.

2. The combination, with a wheeled vehicle having two axles and one of said axles adapted to turn on a vertical axis to steer or guide the vehicle, of a circular rack connected to the axle, an electric motor mounted upon the vehicle, two loose pinions on a shaft to be operated by the motor relatively to each other, a clutch mounted on said shaft axially concentric therewith and to turn the same, a mechanical connection between the shaft and the rack, and suitable means to clutch either of said pinions, as desired.

3. The combination, with a vehicle having an electric motor mechanically connected with an axle or wheels thereof to propel the same, of an axle adapted to turn on a vertical axis, wheels simultaneously driven in opposite directions by the motor, and a suitable clutch whereby either or both of said wheels may be clutched and connected to the latter axle, for the purpose described.

4. The combination, with the steering axle or wheels of a vehicle, of an electric motor, a mechanical connection between the motor and said axle or wheels, a suitable clutch in said connection for tying the motor to and releasing it from said connection, electro-magnets in a circuit to operate the clutch, and a switch to control the current in the circuit.

5. The combination, with the steering axle or wheels of a vehicle, of an electric motor, a suitable clutch to connect the motor with the axle, two electro-magnets in a circuit to operate the clutch, and a switch whereby the current may be passed through either of said magnets independently of the other.

6. The combination, with the steering axle or wheels of a wheeled vehicle, of an electric motor connected to the said axle or wheels, an electric circuit, means in the circuit to control the movement of the axle, and a switch to control the movement of the said means and having parts adapted to move relatively to each other, one of said parts adapted to be operated by hand and the other part operated by the motor or axle, for the purpose described.

7. The combination, with the steering axle or wheels of an electrically-propelled vehicle, of an electric motor to operate the said axle or wheels, an electric circuit, means in the circuit to control the direction of movement of the axle or wheels, and controlling mechanism for said means having movable parts, one of said parts adapted to be moved by hand and the other part arranged to be moved by the motor or steering-axle.

8. The combination, with the steering axle or wheels of a wheeled vehicle, of an electric motor connected to the said axle or wheels to turn the same on a vertical axis, a lever to control the movement of the axle, adapted to turn on a vertical axis, and means to cause the axle to conform exactly or closely to the movements of the said lever.

9. The combination, with a wheeled vehicle having two axles and one of said axles adapted to turn on a vertical axis to steer or guide the vehicle, of a circular rack connected to the axle, an electric motor mounted upon the vehicle, a battery on the vehicle in circuit with the motor, two loose pinions on a shaft geared to said rack and driven in opposite directions by the motor, a clutch between the pinions to clutch either pinion and to turn the shaft, and means to operate the clutch.

10. The combination, with the steering axle or wheels of a vehicle, of an electric motor, a mechanical connection between the motor and said axle or wheels, a secondary battery to supply current to the motor, a suitable clutch in said connection for tying the motor to and releasing it from said connection, electro-magnets in a circuit to operate the clutch, and a switch to control the current in the circuit.

11. The combination, with the steering axle or wheels of an electrically-propelled vehicle, of an electric motor connected to the said axle or wheels, a battery to supply current to the motor, an electric circuit, means in the circuit to control the movement of the axle, and controlling mechanism for said means having movable parts, one of said parts adapted to be moved by hand and the other part arranged to be moved by the motor or steering-axle.

12. The combination, with a wheeled vehicle, of an electric motor mounted upon the back part of the vehicle, a front axle and wheels adapted to be rotated on a vertical axis in either or both directions, a frame for the vehicle shaped to allow the wheels to pass thereunder, a mechanical connection between the motor and axle, arranged to allow the said wheels to pass thereunder and supported by the frame, and means to control the movement of said axle.

13. The combination, with a wheeled vehicle, of an electric motor mounted upon the back part of the vehicle and arranged to propel the same, a secondary battery on the vehicle to supply current to the motor, a front axle and wheels adapted to be rotated on a vertical axis in either or both directions, a frame for the vehicle shaped to allow the wheels to pass thereunder, a mechanical connection between the motor and axle, arranged to allow the said wheels to pass thereunder and supported by the frame, and means to control the movement of said axle.

14. The combination, with the steering axle or wheels of a wheeled vehicle, of an electric motor to operate said axle or wheels, mechanism adapted to be moved by hand, and regulating apparatus for said axle or wheels affected by the movements both of the axle or wheels and said hand mechanism, whereby variations in the relative direction of movement of said axle or wheels and said hand mechanism produce variations in the direction of movement of the axle or wheels.

15. The combination, with the steering-axle of a wheeled vehicle, of an electric motor to cramp said axle, a lever adapted to be moved by hand, an electric circuit, a contact carried by said lever and connected with said electric circuit, and terminals for said circuit, adapted to be moved with the axle by the motor and to bear on said contact, whereby when said terminals are removed from said contact the circuit is broken and the movement of said axle is stopped.

16. The combination, with the steering-axle of a wheeled vehicle, of an electric motor to cramp said axle in either or both directions, a rotating body adapted to be moved by hand, a contact carried by said rotating body, between which a circuit to the motor is completed, and terminals for said circuit carried by the steering-axle and adapted to bear on said contact, whereby the reversal of the movement of said rotating body changes the direction or path of the current and the direction of movement of said axle.

In testimony whereof I have hereunto signed my name this 26th day of February, 1891.

MARK W. DEWEY. [L. S.]

Witnesses:
C. H. DUELL,
H. M. SEAMANS.